United States Patent
Luby

(10) Patent No.: US 7,660,245 B1
(45) Date of Patent: Feb. 9, 2010

(54) FEC ARCHITECTURE FOR STREAMING SERVICES INCLUDING SYMBOL-BASED OPERATIONS AND PACKET TAGGING

(75) Inventor: Michael Luby, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 11/229,009

(22) Filed: Sep. 16, 2005

Related U.S. Application Data

(60) Provisional application No. 60/709,251, filed on Aug. 17, 2005, provisional application No. 60/708,865, filed on Aug. 16, 2005, provisional application No. 60/611,062, filed on Sep. 16, 2004.

(51) Int. Cl.
*H04J 1/16* (2006.01)

(52) U.S. Cl. .................. 370/230; 370/537; 370/390; 714/752; 714/776

(58) Field of Classification Search ......... 370/229–231, 370/235, 236, 389, 390, 341, 474, 476, 477, 370/537, 394; 340/107; 714/774, 752, 757, 714/776
See application file for complete search history.

(56) References Cited

U.S. PATENT DOCUMENTS

| | | | | |
|---|---|---|---|---|
| 5,870,412 A | * | 2/1999 | Schuster et al. | ............. 714/752 |
| 6,079,042 A | * | 6/2000 | Vaman et al. | ............... 714/755 |
| 6,243,846 B1 | * | 6/2001 | Schuster et al. | ............. 714/776 |
| 6,434,606 B1 | * | 8/2002 | Borella et al. | ............... 709/214 |
| 6,771,674 B1 | * | 8/2004 | Schuster et al. | ............. 370/537 |

FOREIGN PATENT DOCUMENTS

WO   WO 96/34463 A1   10/1996

* cited by examiner

*Primary Examiner*—Huy D. Vu
*Assistant Examiner*—Dady Chery
(74) *Attorney, Agent, or Firm*—Kenneth K. Vu; Jeffrey D. Jacobs

(57) ABSTRACT

In a packet communications system stream data is transported over a channel over which packet loss or corruption is possible, with forward error correction ("FEC") information. A transmitter receives source packets comprising source data, generates FEC source packets formatted to allow for identification of lost or corrupted source packets at a receiver, arranges source data from the source packets into a plurality of source symbols wherein at least one source packet is arranged into more than one source symbol, associates a plurality of source symbols with a source block, generates a plurality of repair symbols from the source block according to a predetermined FEC encoding process and groups the plurality of repair symbols into one or more FEC repair packets associated with the source block. A receiver can use the FEC repair symbols from the FEC repair packets to recover source symbols, as needed.

20 Claims, 11 Drawing Sheets

Source pkt that is L bytes in size and that is in source blk with SBN = N, where source blk N already has I source symbols filled by previous source pkts

510

FEC source pkt with SFPID appended to the source pkt

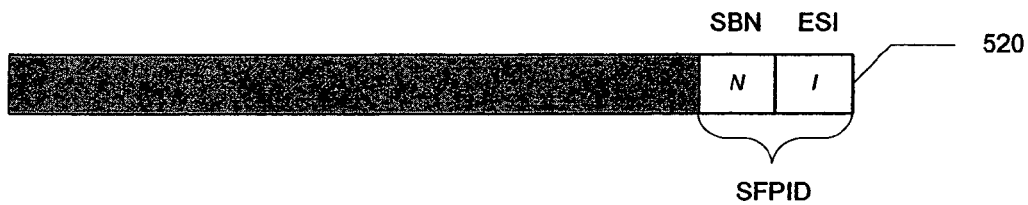
520

SFPID

The portion of the source blk with SBN=N containing the source pkt

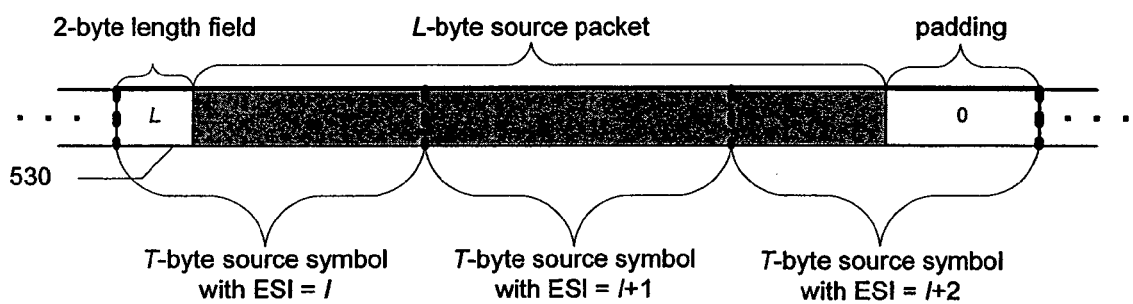

2-byte length field    L-byte source packet    padding

530

T-byte source symbol with ESI = I    T-byte source symbol with ESI = I+1    T-byte source symbol with ESI = I+2

FIGURE 5

FEC ARCHITECTURE FOR STREAMING SERVICES INCLUDING SYMBOL-BASED OPERATIONS AND PACKET TAGGING

CROSS-REFERENCES TO RELATED APPLICATIONS

This application claims priority to Provisional Patent Application No. 60/708,865 filed Aug. 16, 2005, Provisional Patent Application No. 60/709,251 filed Aug. 17, 2005, and Provisional Patent Application No. 60/611,062 filed Sep. 16, 2004.

BACKGROUND OF THE INVENTION

The present invention relates to systems and methods for encoding and/or decoding data, and more particularly to systems and methods for encoding and/or decoding streaming data with forward error correction (FEC).

Forward error correction is useful as it provides information to a receiver that allows the receiver to recover from errors in data transmission. Various techniques for FEC are known. FEC has been used with streaming systems to provide for error correction while dealing with the nature of streams.

One typical nature of a stream is that data is received at a transmitter and must be transmitted before the transmitter receives all of the data or knows definitively how much data is to be transmitted. This is not a requirement, as a file (a set of data elements of a known size that might be available in its entirety to the transmitter at the outset of transmission or transmit data generation) might be processed as if it were a stream. However, the design of a transmitter (and receiver in a communication system) where streams are expected might be a design that includes dealing with transmitting data without knowing the size of the data set to be transmitted or having it available for taking into account in generating the data to be transmitted. Typically, when data is processed as a stream it is expected that the process will proceed apace in real-time or near real-time, i.e., that a transmitter will process data as it is received and transmit the processed data as it becomes available.

One FEC streaming architecture is that based on RFC (Request For Comments) 2733. RFC 2733 describes a basic method for applying a specific FEC erasure code to protect an RTP (Real-Time Protocol) stream against packet loss. With such FEC applications, source packets are padded out to the uniform length for the purpose of generating repair packets from source packets. Thus, even when the lengths of all source packets vary dramatically in size, the size of a repair packet is the maximum of the size of all source packets it is generated from. This can cause wastage of bandwidth for transmitting repair packets. For example, if the maximum size of a source packet that a repair packet is generated from is 1,000 bytes in length, then the repair packet will be around 1,000 bytes in length (the repair packet is actually a couple of bytes longer than the maximum source packet). However, if one of the other source packets that the repair packet is generated from is, for example, 300 bytes in length and this source packet is lost, then the repair packet of over 1,000 bytes is used to recover the missing 300 byte source packet, resulting in over 700 of the bytes of the repair packet to be wasted, which results in wasted transmission bandwidth since the repair packet is transmitted.

What is needed is an apparatus or process for efficient FEC encoding and decoding of stream data that can be implemented easily on various computing devices, that efficiently protects against loss in packet streams with variably sized source packets, that provides the ability to vary in the use of particular FEC codes and that can be used to provide protection to various packet streaming protocols, preferably without modifications specific to the streaming protocol.

BRIEF SUMMARY OF THE INVENTION

In embodiments of encoders and/or decoders according to the present invention, FEC encoding and decoding is performed as described herein using novel apparatus and methods.

In some embodiments, a systematic FEC code is used so that part of the transmitted stream includes the data that is the subject of the transmission, i.e., the data input to the transmitter. Source packets received by the encoder are encoded with an added field for signaling, among possibly other signals, an indication of a source FEC payload. Source packets can comprise multiple symbols and source blocks might comprise symbols from more than one source packet. Repair packets are generated according to the FEC scheme used from the source block with which the repair packets are associated. Numerous benefits are achieved by way of these embodiments. For example, bandwidth is used efficiently even when source packets are of variable size, since repair packets need not be sized according to the largest source packet.

As another example, the data formats can be independent of the original stream packet protocol or format. Examples of stream protocols or formats include RTP, MIKEY and MPEG2.

As another example, the embodiments apply to any systematic FEC code that is source block based and symbol based, where a symbol may be anywhere from a single byte to many thousands of bytes in size.

As another example, each original source packet stream can be sent unmodified except for the addition of a small piece of data to each source packet to form an FEC source packet, where the added small piece of data format is independent of which FEC code is used, and where the small piece of data can be generated immediately when the source packet is available for transmission independent of the size of the final source block that the source packet is associated with.

As another example, the embodiments allow a sender to apply the FEC encoder to generate and send FEC repair packets for each source block to provide protection against packet loss. Embodiments allow a receiver without the FEC decoder to recreate original source packets by simply stripping out the small piece of data added to source packets in received FEC source packets, and simply discard received FEC repair packets.

As another example, the embodiments allow a receiver with the FEC decoder to use received FEC source packets and FEC repair packets to efficiently recreate all the source packets associated with a source block of the original stream even when some of the sent packets are not received as long as the received FEC source and FEC repair packets contain enough symbols.

In a packet communications system stream data is transported over a channel over which packet loss or corruption is possible, with forward error correction ("FEC") information. A transmitter receives source packets comprising source data, generates FEC source packets formatted to allow for identification of lost or corrupted source packets at a receiver, arranges source data from the source packets into a plurality of source symbols wherein at least one source packet is arranged into more than one source symbol, associates a plurality of source symbols with a source block, generates a plurality of repair symbols from the source block according to a predetermined FEC encoding process and groups the plurality of repair symbols into one or more FEC repair packets associated with the source block. A receiver can use the FEC repair symbols from the FEC repair packets to recover source symbols, as needed.

Depending upon the embodiment, one or more of these benefits may be achieved. These and other benefits are provided in more detail throughout the present specification and more particularly below. A further understanding of the nature and the advantages of the inventions disclosed herein may be realized by reference to the remaining portions of the specification and the attached drawings.

BRIEF DESCRIPTION OF THE DRAWINGS

FIG. 5 is a block diagram of an example of a source packet, the resulting FEC source packet after a Source FEC Payload ID ("SFPID") is appended, and how the source packet is stored in the source block.

DETAILED DESCRIPTION OF THE INVENTION

Figure 1:
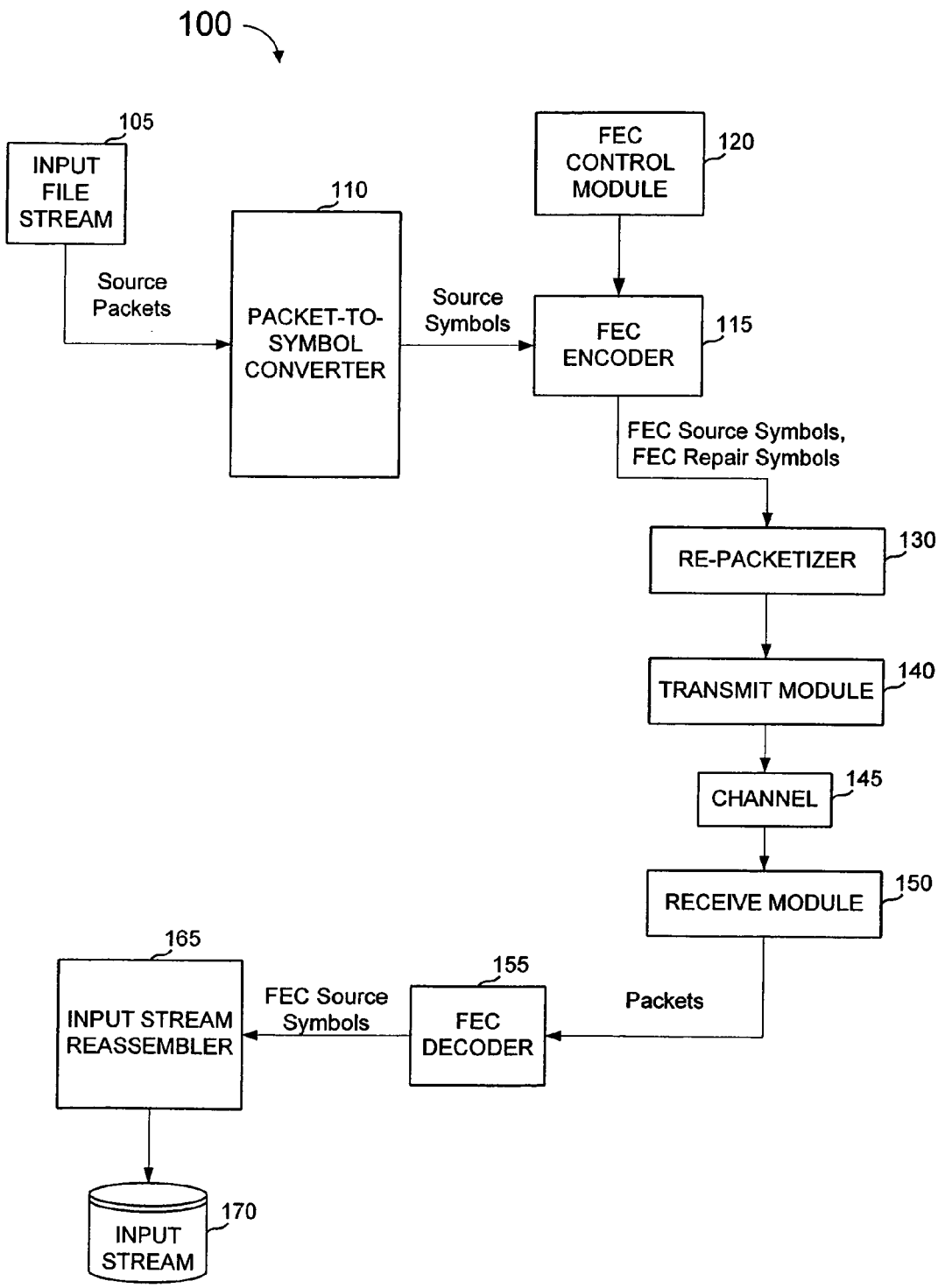
FIG. 1 is a block diagram of a communication system usable to support aspects of the present invention.

As used herein, the term "stream" refers to any data that is stored or generated at one or more sources and is delivered at a specified rate at each point in time in the order it is generated to one or more destinations. Streams can be fixed rate or variable rate. Thus, an MPEG video stream, AMR audio stream, and a data stream used to control a remote device, are all examples of "streams" that can be delivered. The rate of the stream at each point in time can be known (such as 4 megabits per second) or unknown (such as a variable rate stream where the rate at each point in time is not known in advance). Either way, the stream is a sequence of input bits, where each bit has a position in the stream and a value.

Transmission is the process of transmitting data from one or more senders to one or more receivers through a channel in order to deliver a file or stream. If one sender is connected to any number of receivers by a perfect channel, the received data can be an exact copy of the input file or stream, as all the data will be received correctly. Here, we assume that the channel is not perfect, which is the case for most real-world channels. Of the many channel imperfections, two imperfections of interest are data erasure and data incompleteness (which can be treated as a special case of data erasure). Data erasure occurs when the channel loses or drops data. Data incompleteness occurs when a receiver does not start receiving data until some of the data has already passed it by, the receiver stops receiving data before transmission ends, the receiver chooses to only receive a portion of the transmitted data, and/or the receiver intermittently stops and starts again receiving data. As an example of data incompleteness, a moving satellite sender might be transmitting data representing an input file or stream and start the transmission before a receiver is in range. Once the receiver is in range, data can be received until the satellite moves out of range, at which point the receiver can redirect its satellite dish (during which time it is not receiving data) to start receiving the data about the same input file or stream being transmitted by another satellite that has moved into range. As should be apparent from reading this description, data incompleteness is a special case of data erasure, since the receiver can treat the data incompleteness (and the receiver has the same problems) as if the receiver was in range the entire time, but the channel lost all the data up to the point where the receiver started receiving data. Also, as is well known in communication systems design, detectable errors can be considered equivalent to erasures by simply dropping all data blocks or symbols that have detectable errors.

A communication system for communicating stream data is described. As will be explained, a sender receives a stream and applies FEC encoding to the stream as it is transmitted and a receiver receives the potentially imperfect stream and applies FEC decoding to obtain the original stream. The particular FEC code used might be independent of the sending process excepting the FEC encoding step. For example, the FEC code might be Reed-Solomon, LDPC (low-density parity codes), multi-stage fountain codes, etc. The FEC code might also be the null code (wherein no FEC is actually added, but the receiver handles the data correctly anyway). Architectures described herein might also be used for download delivery of data.

Another limitation of RFC 2733 is that it only allows one specific FEC code, a simple parity code, to be used for protection, and this particular code is very weak at protecting against packet loss. For example, if two or more packets are lost from an encoding block then recovery is not possible. What would be much better is the ability to use advanced FEC codes for protection, and an FEC streaming architecture that allows the usage of a wide class of FEC codes interchangeably within the architecture. Another limitation of RFC 2733 is that it only works with the RTP protocol and will not work with other streaming protocols. The reason for this is that RFC 2733 relies upon the sequence numbers in the RTP header for determining which source packets a repair packet is generated from. What would be much better is the ability to use an FEC streaming architecture with any streaming protocol, without dependencies or support needed from the streaming protocols for the architecture to work.

What is needed is an apparatus or process for efficient FEC encoding and decoding of stream data that can be implemented easily on various computing devices, that efficiently protects against loss in packet streams with variable size source packets, that provides the ability to use any of a wide class of FEC codes interchangeably including advanced FEC codes, and that can be used to provide protection to any packet streaming protocol without modifications specific to the streaming protocol, for example that applies equally well to RTP, MPEG2, MIKEY.

Suitable FEC encoding schemes include the fountain codes or chain-reaction codes described in U.S. Pat. No. 6,307,487 to Luby entitled "Information Additive Code Generator and Decoder for Communication Systems" and U.S. Pat. No. 7,068,729 [Published application Ser. No. 10/032,156] to Shokrollahi et al. entitled "Multi-Stage Code Generator and Decoder for Communication Systems", each of which is incorporated by reference herein for all purposes.

Overview

Figure 2:
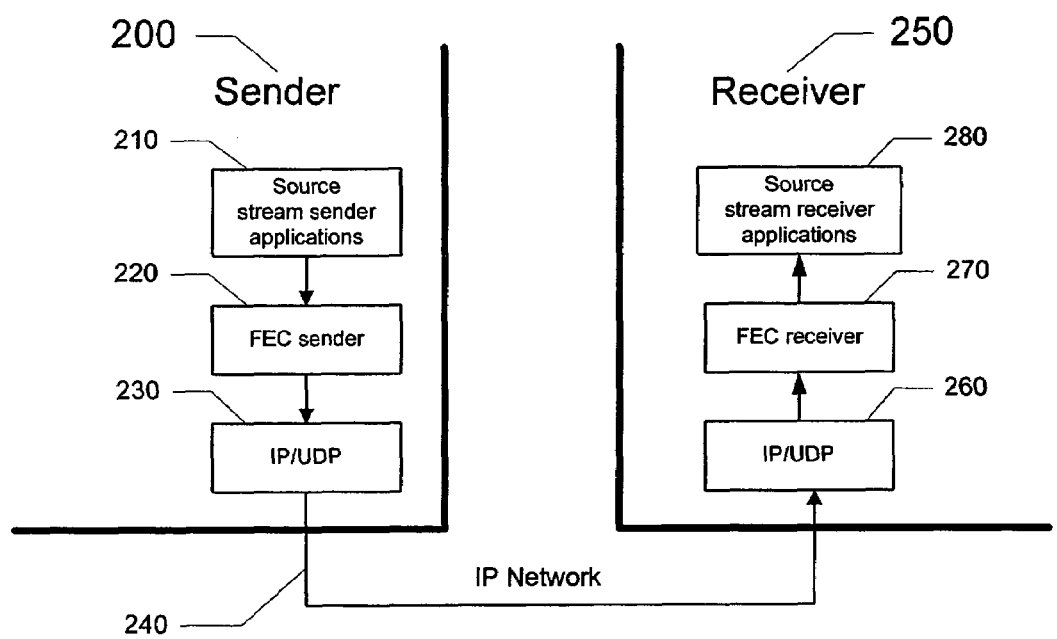
FIG. 2 is a block diagram of an example of a transmitter transmitting packet streams to a receiver over a packet network according to an embodiment of the present invention.

A high-level overview of one possible overall architecture is provided in FIGS. 1-2. FIG. 1 is a block diagram of a communications system 100 that uses aspects of the present invention. In communications system 100, an input stream 105 is provided to a packet-to-symbol converter 110. Converter 110 takes in source packets of input stream 105 and generates a sequence of one or more source symbols. Preferably, an input source packet is arranged into an integer number of one or more source symbols, where the last symbol may only be partially filled by the packet. These source symbols are provided to an FEC encoder 115, which might group symbols into blocks and which outputs FEC source symbols and FEC repair symbols in accordance with an FEC code, which might be variable and supplied by FEC control module 120. FEC control module 120 might select one of several codes to use, perhaps in dependence upon transmission requirements and/or conditions.

In some embodiments, "providing" does not require data movement. For example, a device that operates as a transmitter might receive in packet data, store it in memory and have each component deal with the data in memory with each component considering data boundaries (packet, symbol, block) according to its own processes. Thus, one data set stored in memory can be treated as a plurality of packets by a component that identifies packet boundaries while that same stored data is treated as a plurality of symbols by a component that identifies symbol boundaries and treated as a plurality of blocks by a component that identifies blocks. Preferably, blocks comprise whole numbers of symbols. Also preferably, each symbol contains data from at most one packet, although some symbols may be only partially filled with data from a packet. Thus, preferably symbols do not overlap block or packet boundaries. In some embodiments, packets may or may not overlap block boundaries and vice versa.

Where FEC encoder 115 is an encoder that uses a key stream, a key generator might be provided. Counters for symbols, packets and blocks might also be provided. Where FEC encoder 115 is a systematic encoder, the encoded symbols comprise the source symbols plus some repair symbols. Preferably, the encoded source symbols are grouped into packets as they were in the input stream, so that encoded source packets might not contain portions of source symbols that contain padding or other information not contained in the original packets and thus encoded source packets might be the same as the input source packets, possibly including extra fields. Examples of this are described below.

FEC encoder 115 provides encoded symbols (source and repair) to a re-packetizer 130 that generates encoded source packets and encoded repair packets, which in turn provides the packets to a transmit module 140. Transmit module 140 transmits the encoded packets over a channel 145 to a receive module 150. Channel 145 is assumed to be an erasure channel, but that is not a requirement for proper operation of communication system 100. Modules 140, 145 and 150 can be any suitable hardware components, software components, physical media, or any combination thereof, so long as transmit module 140 is adapted to transmit encoded packets any needed data about their keys to channel 145 and receive module 150 is adapted to receive symbols and potentially some data about their keys from channel 145.

As explained above, channel 145 can be a real-time channel, such as a path through the Internet or a broadcast link from a television transmitter to a television recipient or a telephone connection from one point to another, or channel 145 can be a storage channel, such as a CD-ROM, disk drive, Web site, or the like. Channel 145 might even be a combination of a real-time channel and a storage channel, such as a channel formed when one person transmits an input file from a personal computer to an Internet Service Provider (ISP) over a telephone line, the input file is stored on a Web server and is subsequently transmitted to a recipient over the Internet.

Because channel 145 is assumed to be an erasure channel, communications system 100 does not assume a one-to-one correspondence between the output symbols that exit receive module 150 and the output symbols that go into transmit module 140. In fact, where channel 145 comprises a packet network, communications system 100 might not even be able to assume that the relative order of any two or more packets is preserved in transit through channel 145. Conventional packet handling techniques can be used for transport of packets. Transmit module 140 might operate independently of lower layer protocols used for transmission.

Receive module 150 provides the output symbols to an FEC decoder 155. Decoder 155 uses repair packets as needed to recover lost source symbols to reconstruct source data, preferably reconstructing source packets with their original packet boundaries.

An input stream reassembler 165 may be provided to reconstruct/reformat data to reproduce the original input stream as a regenerated input stream 170.

FIG. 2 illustrates a layer view of the communication system, wherein a source stream sender application 210 communicates with an FEC sender 220 at a lower layer and FEC sender 220 communicates with a lower IP/UDP layer 230, while the inverse path at a receiver is used. Source stream sender application 210 provides FEC sender 220 with source packets as they become available for transmission, and FEC sender 220 processes these packets and passes FEC source packets and FEC repair packets to IP/UDP layer 230 for transmission over an IP network 240. Other networks can be used as well.

A receiver 250 comprises an IP/UDP layer 260, an FEC receiver 270 and a source stream receiver application 280. The FEC source and FEC repair packets that arrive to receiver 250 from IP network 240 are processed by IP/UDP layer 260 and passed to FEC receiver 270 to recover the original source packet stream that is provided as it is available to source stream receiver application 280.

Some examples of possible source stream sender application 210 include an RTP (real-time transport protocol) stream sender, an MPEG2 stream sender and a MIKEY stream sender. Other overall architectures are equally possible, including architectures where there is also data sent from receivers to senders, and including architectures where other networks that are not Internet Protocol (IP) based are used, and/or where IP/UDP is not used but instead some other lower level protocol is used for transmitting packets, and/or alternative architectures where for example a security protocol such as IPSEC is used to provide encryption.

In other embodiments, the source stream sender applications do not supply the FEC sender with a stream of source packets but instead supply, for example, a stream of bits that have not been packetized. In this case, the FEC sender may first determine how to split the stream of bits into packet payloads and how to create packet headers for these packet payloads to create the source packets that can then be processed as described herein. Similarly, the source stream receiver applications may expect, for example, a stream of bits to be provided instead of source packets, in which case the FEC receiver will create the stream of bits from the recreated source packets that will then be supplied to the source stream receiver applications. One or more source stream applications might be used.

Figure 3:
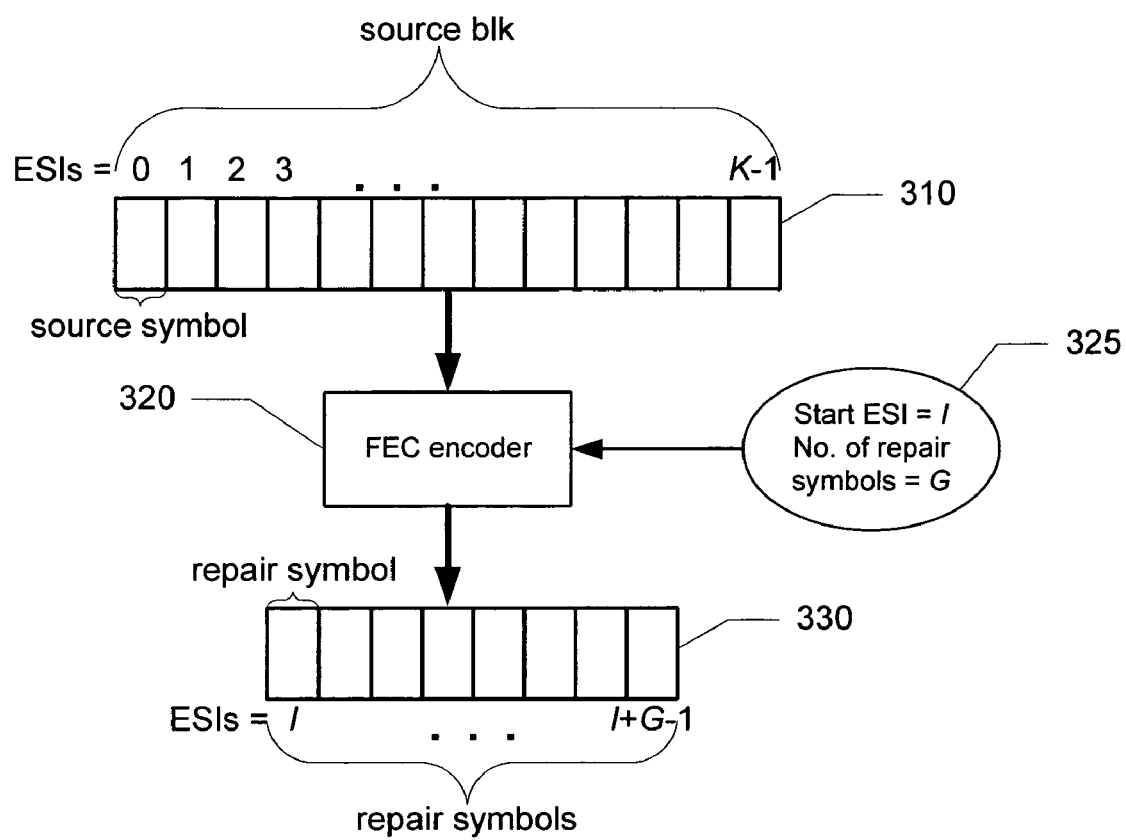
FIG. 3 is a block diagram of an example of a source block comprising source symbols that is processed by an FEC encoder to generate repair symbols.

An FEC code is used to provide protection against packet loss between the sender and the receiver. The FEC codes that can be used in conjunction with the embodiments described herein are a broad class of FEC codes. Any FEC code that is systematic, symbol-based and source block based can be used. As shown in FIG. 3, a source block 310 is data that is partitioned into some number K of source symbols, where each source symbol is of the same length T in bytes, and the resulting repair symbols 310 are also each T bytes in length. The FEC encoder 320 generates repair symbols 330 from the source block 310. One example use of an FEC encoder is shown in FIG. 3, where the FEC encoder 320 may be called multiple times to generate additional repair symbols from a source block of source symbols 310, and each time the FEC encoder 320 is called it is supplied with a start Encoding Symbol ID (ESI) of I and the number G of repair symbols 325 to generate on that call, and then the FEC encoder 320 generates repair symbols corresponding to ESIs I, I+1, . . . , I+G−1. There are many examples of systematic, symbol and source block based FEC codes, including Reed-Solomon codes, LDPC codes, multi-stage fountain codes, etc.

The source blocks are created from the stream of source packets containing the original data that will be sent to the receiver. A transmitter partitions source symbols into source blocks. The source blocks can be sequentially numbers, for example, with Source Block Numbers (SBNs) starting sequentially with zero.

Figure 4:
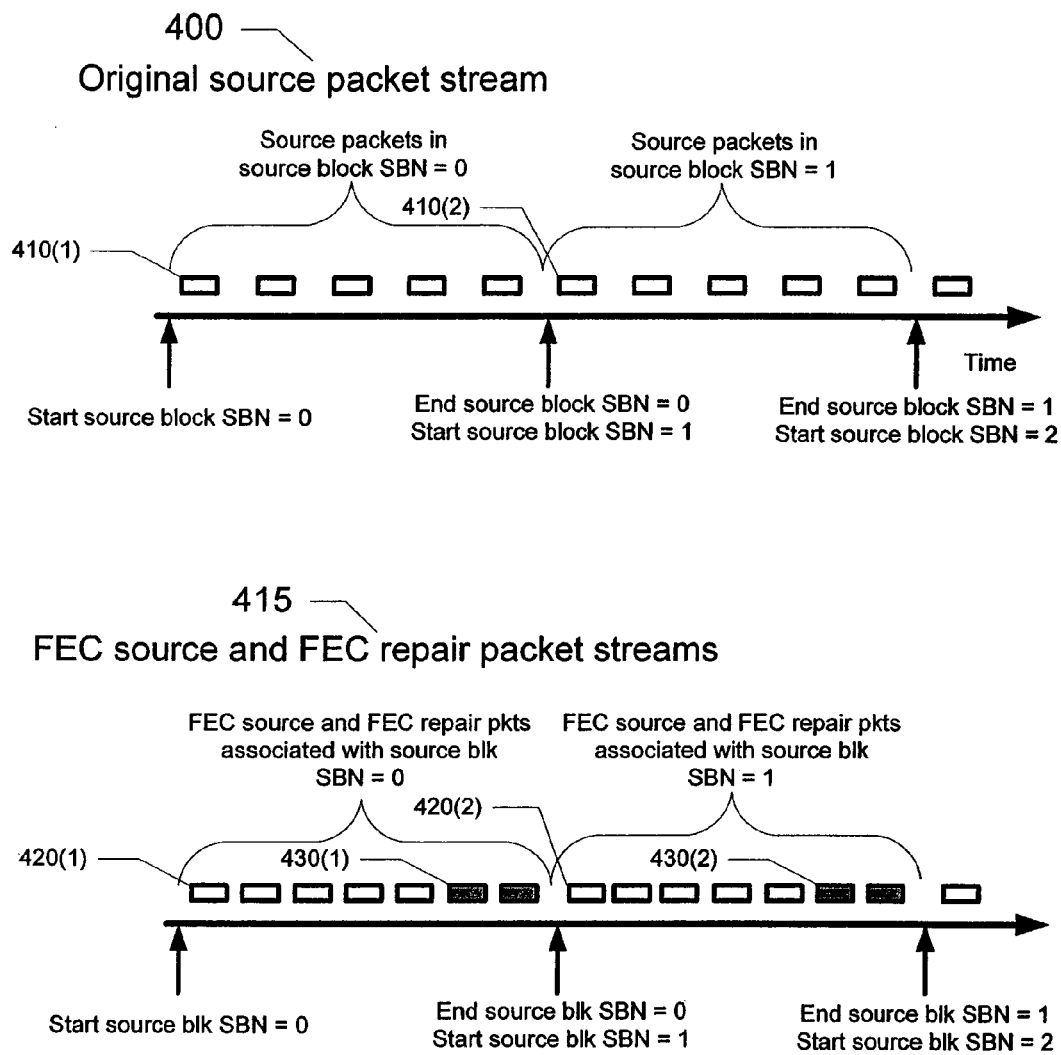
FIG. 4 is a block diagram of an example of a source packet stream, how the source packets are partitioned into consecutive source blocks, and then how FEC source and FEC repair packets are sent for each source block.

FIG. 4 shows how an original source packet stream 400 comprising source packets 410 might be partitioned into consecutive source blocks. For example, source packet 410(1) is the first source packet of the source block with Source Block Number (SBN) equal to 0, and source packet 410(2) is the first source packet of the source block with SBN=1. FIG. 4 also shows the output of the FEC sender is FEC source packet and FEC repair packet streams 415, where unshaded boxes correspond to FEC source packets and shaded boxes correspond to FEC repair packets. As shown in this example, the FEC source packets that correspond to the original source packets for a source block might be sent first within the stream, followed by the FEC repair packets generated from the source block. For example, FEC source packet 420(1) corresponds to source packet 410(1) and is sent first among packets sent for the source block with SBN=0 and FEC repair packet 430(1) is the first FEC repair packet sent for the source block with SBN=0 that is sent after all the FEC source packets for the source block with SBN=0. Similarly, FEC source packet 420(2) corresponds to source packet 410(2) and is sent first among packets sent for the source block with SBN=1 and FEC repair packet 430(2) is the first FEC repair packet sent for the source block with SBN=1 that is sent after all the FEC source packets for the source block with SBN=1. An FEC source packet that "corresponds" to a source packet might contain all the same data plus an additional field or fields.

The stream of FEC repair packets created from the source blocks can be sent in a separate stream from the FEC source packets. The FEC sender configures and determines the amount of original data in source packets that is added to each source block, thus controlling the delay created before FEC decoding is possible at the FEC receiver, and the FEC sender also determines and configures the protection level employed by selecting the amount repair symbols to be generated and transmitted in FEC repair packets. The determination of the protection level by the FEC sender may be based on factors such as known characteristics of the network, available bandwidth, ongoing feedback to the FEC sender on network conditions from network elements, and direct ongoing feedback to the FEC sender from receivers of the streams.

In other embodiments, FEC repair packets for a source block might be sent before FEC source packets for that source block, the FEC source packets and FEC repair packets for a source block might be intermixed, and packets from different source blocks might be mixed in the transmission order.

Source packets might be processed by the FEC sender as shown in FIG. 5. Consider the state wherein the source block with SBN=N is a "current" block being processed. Suppose the first I source symbols of the current block are already present in memory from prior packets and a current source packet 510 that is L bytes in size is to be added to the current source block. The FEC sender appends a Source FEC Payload ID (SFPID) to the source packet to create the FEC source packet 520 that is to be transmitted. The SFPID is one of the additional fields mentioned above. As shown, the SFPID comprises the Source Block Number (SBN) of the source block and an Encoding Symbol ID (ESI). The SBN is the source block number of the source block that the source packet is part of, for example the SBN is set to N in this example. The ESI is the index of the first source symbol within the source block that the source packet is to fill, i.e., the ESI is set to I in this example. Thus, by reading an FEC source packet's SFPID, a module can determine which block the packet belongs with as well as where the packet sits within the source block.

Preferably, the length of the SFPID is fixed independent of which FEC code is used, for example the SBN is a two-byte field and the ESI is a two-byte field and thus the SFPID is four-bytes in length. If the length of the SFPID is fixed independent of which FEC code is used, then FEC receivers that do not have the FEC decoder corresponding to the FEC encoder used by the FEC sender can simply discard the fixed-length SFPID from received FEC source packets to recreate source packets at the receiver. Also preferably, the fields and interpretations of those fields within the SFPID are fixed independent of the FEC code used, as this allows the same logic to be used at the FEC sender and the FEC receiver independent of the FEC code used, except for the actual FEC encoding and FEC decoding which are of course dependent on which FEC code is used.

The fields of the SFPID, the lengths of these fields and their interpretations are preferably as described above, although other possibilities may also be desirable. For example, an ESI field that is longer than two-bytes may be needed if the number of source and repair symbols for a source block exceeds 65,536. In some cases the number of source blocks in the stream may exceed 65,536, but in many streaming applications it is allowable to reuse the same SBN space, for example to reuse the SBN numbers for source blocks starting from zero after SBN 65,535 is used, as long as there is no or little possibility of having two active source blocks at the FEC receiver with the same SBN at the same time. In some streaming applications, a one-byte SBN may be sufficient. For other streaming applications where there is a requirement that all source blocks are uniquely identified, a longer SBN field may be appropriate. As another example of alternative SFPID formats, if the length of a symbol varies from source block to source block, then it may be desirable to include the symbol length in the SFPID so that the FEC receiver can process FEC source packets as they arrive and place the appropriate data for them in the source block in the appropriate positions.

The data for the source packet is placed into the source block as shown in 530 of FIG. 5. As shown, the first two bytes of the source symbol with ESI=I in the source block with SBN=N is filled with the length L of the source packet in bytes, followed immediately by the L bytes of the source packet. This data may cover more than one source symbol within the source block, for example three source symbols as shown in 530 of FIG. 5. Then, as shown in 530 of FIG. 5, the last source symbol touched by the data is padded with zeroes if necessary to fill this source symbol. Predetermined settings other than zeroes for the padding bytes can be used, as long as the same padding values are used by FEC senders and FEC receivers. The FEC sender adds complete source packets to the source block. The lengths of the source packets in the source block added by the FEC sender help the FEC receiver delineate the source packets in the source block when they are recovered. The FEC receiver, after reconstructing all or parts of the source block using received FEC repair packets, can determine the length and location of recovered source packets within the source block in order to pass complete source packets to source stream receiving applications. Note that two-bytes used for writing the length of the source packet into the source block is preferred, but for example one-byte may be used to save space if for example source packets are at most 256 bytes in size, or more than two-bytes could be used if, for example, source packets exceed 65,536 bytes in size. In applications where the source packets are all the same size, it may be preferable to signal the source packet size in the session setup and then not write the source packet length in the source block and instead just place the source packet in the source block with no indication of its length. In this case the FEC receiver determines the length of all source packets from the size passed in the session setup, and the lengths of source packets may be omitted from the source block.

The FEC receiver uses the SFPID in a received FEC source packet to determine which source block it belongs to and how the data for the source packet recreated from the FEC source packet is to be placed in the source block. When the FEC receiver detects missing source packets from a source block, it can use repair symbols received in FEC repair packets to decode the missing source symbols of the source block and then recreate the missing source packets.

When adding the SFPID to a source packet, the FEC sender determines how the source packet will be placed into the source block. The actual generation of the source block and FEC encoding is performed either incrementally as source packets are added to the source block, or later.

Figure 6:
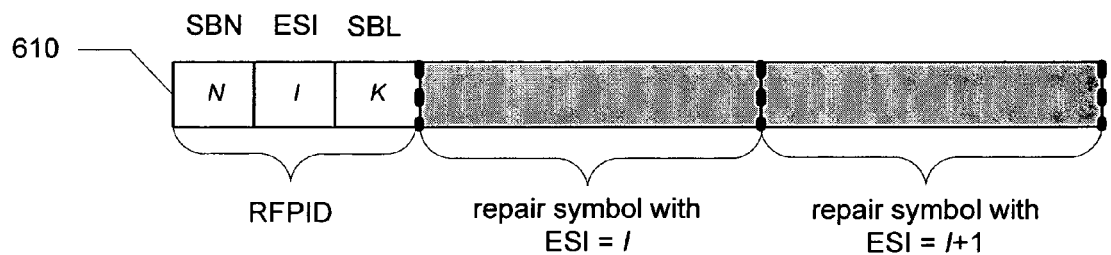
FIG. 6 is a block diagram of an example of an FEC repair packet, containing a Repair FEC Payload ID ("RFPID") and the associated repair symbols.

The FEC sender places the source packet into the source block according to the SFPID. When all source packets data in the source block are in place, the FEC encoding of the source block can be completed. The resulting repair symbols are placed into what are called FEC repair packets. Thus, source packets are input, converted (perhaps only logically by considering symbol boundaries rather than packet boundaries) to source symbols, FEC source packets are generated from source packets, FEC repair symbols are generated for FEC source symbols, and FEC repair packets are formed with FEC repair symbols. As shown in FIG. 6, each FEC repair packet 610 comprises a Repair FEC Payload ID (RFPID) identifying contents of the packet (i.e., which one or more repair symbols are present) followed by the repair symbols themselves. In a preferred embodiment, the RFPID comprises a two-byte Source Block Number (SBN), a two-byte Encoding Symbol ID (ESI) and a two-byte Source Block Length (SBL). The SBN identifies the source block from which the repair symbols are generated and thus the source symbols that might be recoverable using those repair symbols. The ESI identifies how the repair symbols are generated from the source block. The SBL indicates the number of source symbols in the source block to which these repair symbols apply. The RFPID format might depend on the particular FEC code used in the application, since only an FEC receiver equipped with the FEC decoder corresponding to the FEC encoder used by the FEC sender will potentially interpret and use FEC repair packets. Which FEC encoder is used by the FEC sender is generally signaled in the session setup. Note that the SBL is included in the RFPID but not in the SFPID because generally the SBL is only needed by the FEC receiver if any FEC decoding is performed, and non-trivial FEC decoding can only be performed if at least one FEC repair packet is received. The SBL might not be known in advance at the FEC sender as the source block is being filled, and generally it is preferable to send FEC source packets with as little delay as possible at the FEC sender potentially before the source block is complete, and thus it is preferable that the SBL is not included in FEC source packets.

The usage of separate streams for the FEC source packets and the FEC repair packets, i.e., an original stream and a repair stream, allows for the greatest flexibility and simplifies handling. One alternative that might be appropriate for a broadcast or multicast application for distinguishing the two streams at the FEC receiver is to send the original stream to one destination address and send the repair stream to a different destination address. This alternative provides flexibility for network nodes to filter or only distribute FEC repair packets to receivers actually desiring it, and/or allows receivers to decide whether or not to join the repair stream to receive FEC repair packets. Another alternative is to send the two streams to the same destination address but to different destination ports. With this alternative generally FEC receivers will receive both FEC source packets and FEC repair packets, but they can distinguish between the two types of packets based on the port number on which they are received. A third alternative is to send the two streams to the same destination address and port, but to distinguish between the two streams via additional information in the packet headers. With this alternative generally FEC receivers will receive both FEC source packets and FEC repair packets and will not be able to distinguish based on which port they are received on, but the FEC receiver can distinguish between the two types of packets based on packet header information.

The FEC receiver combines the data received from the original stream and the repair stream to try to repair losses when they occur. The data from the FEC source packets in the original stream is placed into a source block based on the SFPID. As with the transmitter, "placing" might not involve data movement but just logical association of symbols from packets with particular blocks. The received repair symbols in the FEC repair packets are also associated with the source block, and when sufficient data is received, the FEC decoder can reconstruct missing source packets if any, up to what is achievable by the FEC decoder with what is received.

An FEC receiver can determine the FEC configuration and mechanisms for example using SDP or similar mechanisms in a session setup. This configuration may include signaling the addresses and ports upon which the original and repair stream will be received, signaling the FEC code to be used and the symbol size to be used.

The above architecture is only an example of possible overall architectures to which the embodiments described below can apply.

An Implementation of an FEC Packet Architecture for Streaming Services

The following describes an efficient FEC packet architecture for protecting a source packet stream from loss that can be effectively used with an FEC code. The FEC sender adds a stream of FEC repair packets generated from the source packets to the original stream of source packets, and an SFPID is added to each source packet to form an FEC source packet before it is transmitted. Symmetrically, the FEC receiver receives a stream of FEC source and FEC repair packets and regenerates the original stream of source packets. The FEC sender and FEC receiver can be specially programmed or configured computing devices and/or communicating devices.

As will be explained, this efficient approach can be used with any FEC code that is symbol-based and source-block-based. The source blocks that are formed from source packets are partitioned into source symbols, and then repair symbols are generated using the FEC encoder from the source symbols of the source block and placed into FEC repair packets. The relative number of repair symbols to source symbols might be fixed or not depending on the FEC code used. For example, if the FEC code rate is fixed and is R, then the number of repair symbols might be up to $((1/R)-1)$ times the number of source symbols. The number of repair packets might depend on the number of repair symbols.

FEC Receiver Session Information

The FEC receiver obtains the information it needs for the source and repair streams, including destination addresses and port numbers, and Other FEC information described below in a receiver session setup, for example using SDP or as another example using preconfigured settings.

Other FEC Information

Besides the identity of the FEC encoder used at the FEC sender and related information such as the format and interpretation of the RFPID carried in FEC repair packets, the FEC session information preferably includes the symbol size T. The value of T is preferably the same for the entire duration of the stream and can be obtained by the FEC receiver via some session setup protocol, such as SDP. A recommended method for deciding on a value for T is to base it on the maximum source block size to be used in the session, on the amount and nature of variability of source packet sizes in the session and on the FEC code to be used for the session. The value of T indicates the size of both source and repair symbols. Alternatively, the value of T could change from source block to source block, in which case the value of T might be communicated to the receiver for each source block, for example by carrying the value of T in a separate field within the SFPID of FEC source packet and/or in the RFPID of FEC repair packets.

Packet and Source Block Formats

This section details the packet structure and source block structure that can be used generically with suitable FEC codes.

FEC Source Packets

A preferred SFPID added to the source packets is 32 bits comprising a 16 bit Source Block Number (SBN) and a 16 bit Encoding Symbol ID (ESI), as shown in FIG. 5. The SFPID is added to each source packet to form an FEC source packet 520 as shown in FIG. 5, and the FEC source packet is transmitted by the FEC sender.

The SBN is the source block number for the set of source packets that together form the source block. Source blocks can be numbered consecutively modulo $2^{16}$. The source blocks are partitioned into source symbols that are T bytes in length and the number of source symbols in a source block is designated herein by K, where the value of K generally may vary from source block to source block. Depending on the FEC code, a source packet may span multiple source symbols (and potentially the end of the packet partially covers the last such source symbol) and an FEC repair packet may contain multiple repair symbols.

The ESI within the SFPID of an FEC source packet is the index of the first source symbol of the source block that carries information about the packet, where source symbols are numbered from 0 to K−1 within a source block.

Let SP be the maximum size of a source packet in the session, where the value of SP may be influenced for example by a video or audio codec, a source packetization protocol and the following considerations. Preferably, T is a divisor of SP+2, where 2 is the length of the packet length field written into the source block. For example, for source RTP packets where the RTP header is 12 bytes and when the length of the packet length field is 2 bytes and the symbol size is T=16, then maximum RTP packet length might be 20·T−2=318 bytes, which means that the maximum RTP payload is 318−12=306 bytes. With this relationship between SP and T, each maximal source packet occupies an integral number of symbols of the source block. In this example, this comprises two bytes to write the length and 318 bytes to write the RTP packet, which comprises a 12 byte RTP header and 306 bytes of RTP payload, for a total of 320 bytes, equal to 20 symbols each of length 16 bytes. The total size of a maximal FEC source packet is SP+4 bytes, i.e. the maximum size of a source packet plus 4 bytes for the SFPID. For example, if SP=318, then the total size of an FEC source packet is 322 bytes. When an FEC source packet is encapsulated in IP/UDP for transmission an additional 28 bytes of IP/UDP header is typically added when using IPv4.

Source Blocks

Source blocks can be formed dynamically as source packets arrive at the FEC sender. A source block contains the data of original source packets that would have been sent if no FEC code were used, plus potentially the lengths of these source packets.

Let L be the length in bytes of a packet that is to be added to the source block. When the packet is placed into the source block, the value of L can be written into the source block as a two-byte value, followed by the packet. The placement of data about each packet starts at a source symbol boundary.

An example of forming the first source block follows, where the symbol size T is 16 bytes. Initially, the source block contains K=0 source symbols. If the first source packet is 26 bytes in length, then "26" is written into the first two bytes of source symbol 0 of the source block followed by the 26 bytes of the packet. The packet then spans U=ceil((2+26)/16)=2 source symbols. The last four bytes of source symbol K+U−1=1 are filled with zeroes to the next source symbol boundary, and the number of source symbols K in the source block is updated to K+U=2. If the second source packet is 52 bytes in length, then "52" is written into the first two bytes of source symbol 2 of the source block followed by the 52 bytes of the packet. The packet then spans U=ceil((2+52)/16)=4 source symbols. The last 10 bytes of source symbol K+U−1=5 are filled with zeroes to the next source symbol boundary, and K is updated to K+U=6. If the third source packet is 103 bytes in length, then "103" is written into the first two bytes of source symbol 6 of the source block followed by the 103 bytes of the packet. The packet then spans U=ceil((2+103)/16)=7 source symbols. The last 7 bytes source symbol K+U−1=12 are filled with zeroes to the next source symbol boundary, and K is updated to K+U=13. If the third source packet is the last of the source block then the number of source symbols in the source block is K=13.

FEC Repair Packets

Each FEC repair packet contains a RFPID, followed by the repair symbols as shown in FIG. 6. The RFPID of FEC repair packets may have a different format from the SFPID of FEC source packets. The RFPID for FEC repair packets might comprise a 16-bit Source Block Number (SBN), a 16-bit Encoding Symbol ID (ESI) and a 16-bit Source Block Length (SBL) as shown in 610 of FIG. 6. The SBN identifies from which source block the repair symbols contained in the payload of the repair packet were generated, the ESI identifies how the repair symbols were generated from the source block and the SBL is the number of source symbols in the source block. How the value of the ESI is determined and how the repair symbols are generated based on the ESI can be FEC code specific.

The total length RP in bytes of the repair symbols in an FEC repair packet is preferably an integer number of symbols, i.e., a multiple of the symbol size T. The number, G, of repair symbols in the FEC repair packet is then RP/T. All information necessary to form and send the FEC repair packets for a given source block is available by the time the last FEC source packet of the source block is added to the source block.

Since the total length of the repair symbols in an FEC repair packet is RP, the size of the FEC repair packet is RP+6 bytes including an RFPID of 6 bytes. For example, if RP=320, then the total size of an FEC repair packet is 326 bytes. When an FEC repair packet is encapsulated in IP/UDP for transmission an additional 28 bytes of IP/UDP header is added.

It is recommended that SP and RP are set to similar values, and that all FEC repair packets for a given source block generally carry close to the same number of repair symbols (but it is not necessary that the same number of repair symbols are in each FEC repair packet, and in some cases it is desirable to allow different numbers of repair symbols in different FEC repair packets for a source block).

FEC Sender

Figure 7:
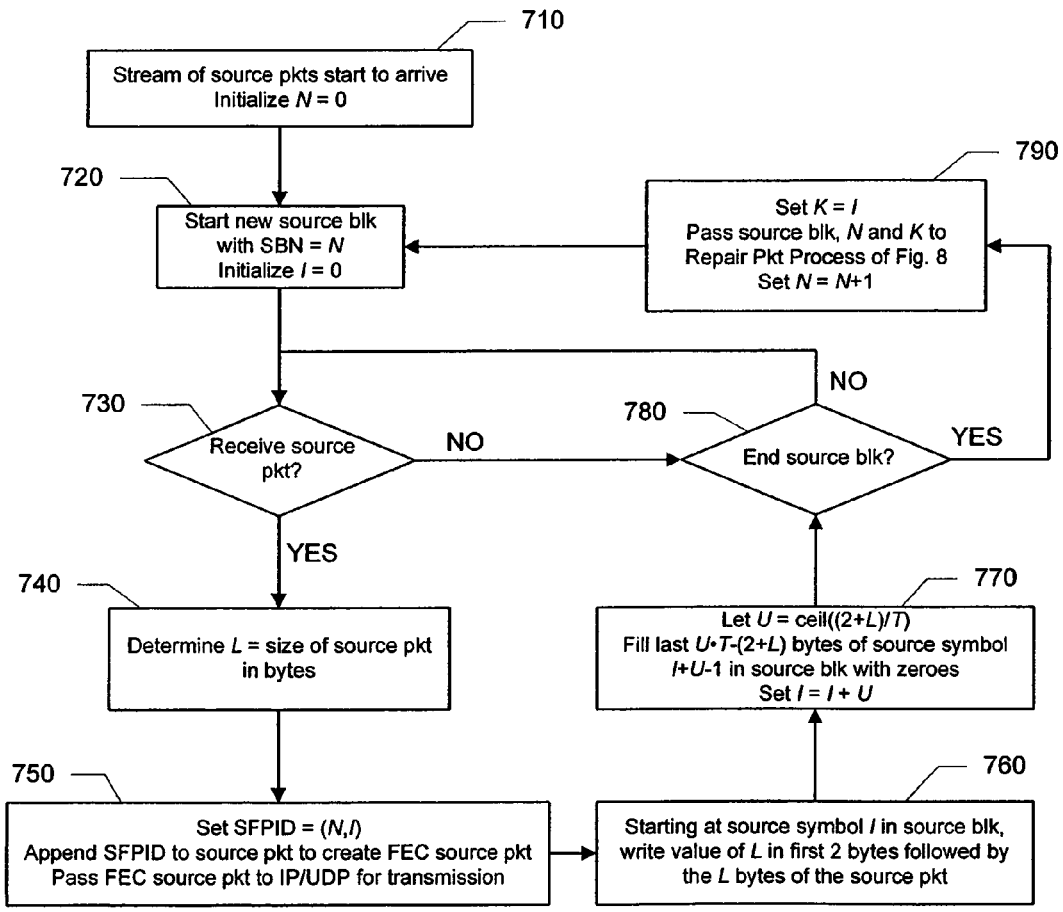
FIG. 7 is an illustrative embodiment of the logic of a Source Packet Process that could be part of an FEC sender.
Figure 8:
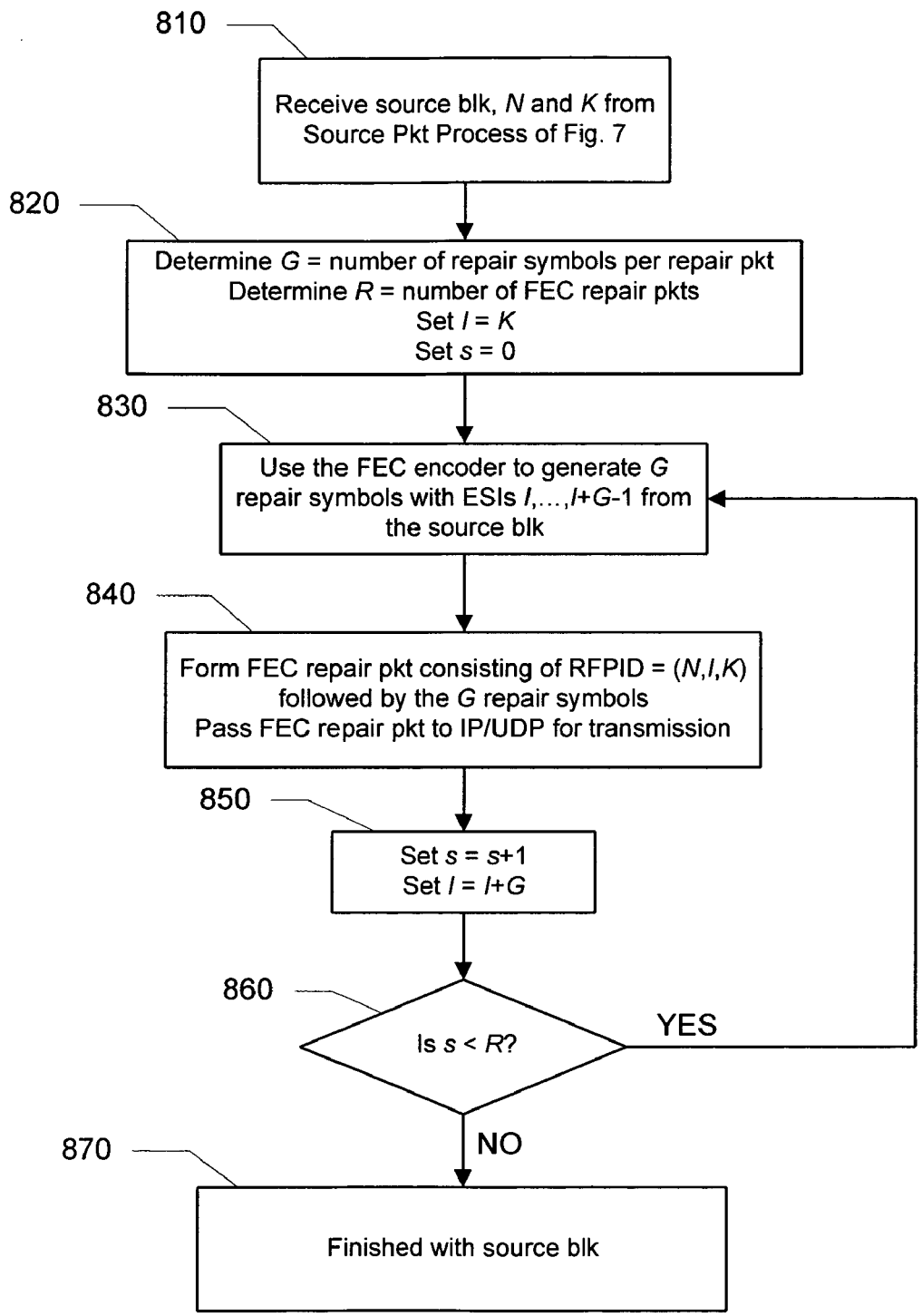
FIG. 8 is an illustrative embodiment of the logic of a Repair Packet Process that could be part of an FEC sender.

In this exemplary description of the logic of an FEC sender, the FEC sender is described as comprising two parts, a Source Packet Process that is shown in FIG. 7 and a Repair Packet Process that is shown in FIG. 8.

An exemplary description of the logic of the Source Packet Process is shown in FIG. 7. In Step 710, when the stream of source packets start to arrive the source block number N is initialized to zero and processing proceeds to Step 720. In Step 720, a new source block is initialized with SBN=N and the integer counter I (which tracks the number of source symbols added to the source block) is initialized to zero. In Step 730, it is checked to see if a source packet has been received, and if it has then processing continues to Step 740 and if not then Steps 740 through 770 are bypassed and processing continues at Step 780.

In Step 740, the length L of the source packet in bytes is determined, and generally this step is performed by being provided the value of L from some other process, such as the process that generates the source packets or receives the source packets and provides them to the FEC sender. In Step 750, the SFPID for the source packet is set to (N,I), where N is the SBN for the source block and I is the number of source symbols already filled in within the source block. Also in Step 750, the SFPID is added to the source packet to form the FEC source packet and then the FEC source packet is passed to IP/UDP to add the IP/UDP header and transmit the packet to the IP network. There may be other logic that determines the exact timing of the transmission of the FEC source packet to the IP network that is not shown.

In Step 760, the 2-byte value of L is written into the source block starting at the symbol position indicated by ESI=I, and then the L-byte value of the source packet is written into the source block following immediately after the 2-byte value of L. In Step 770, the value of U is calculated, where U is the number of source symbols of the source block that are fully or partially filled by the data for the source packet. Then, the remaining U·T−(2+L) bytes of the last source symbol (with ESI=I+U−1) are filled with zeroes and I is set to I+U in Step 770.

In Step 780, a decision is made to end the source block or not, where this step is reached either directly from Step 730 if no source packet has been received or from Step 770 if a source packet has been received. The decision in 780 could be based on many factors, including the amount of time that has passed since the current source block was started, the total length of the source block and characteristics of the stream format, for example alignment on Group of Pictures boundaries for an MPEG2 stream. If the source block is not ended in Step 780 then processing returns to Step 730, but if the source block is ended then processing proceeds to Step 790.

In Step 790, the number K of source symbols in the source block is set to the current number I of source symbols in the source block and then the relevant information about the source block, which includes the source block itself and the source block number N and the number of source symbols in the source block K, is passed to the Repair Packet Process of FIG. 8. Then, the value of N is reset to N+1 in Step 790 in preparation for the next source block, and processing proceeds to Step 720 to start the next source block.

An exemplary description of the logic of the Repair Packet Process is shown in FIG. 8. In Step 810 the relevant information about the source block is received from the Source Packet Process of FIG. 8, where this information includes the source block itself and the source block number N and the number of source symbols in the source block K. In Step 820 the number G of repair symbols to include in each FEC repair packet is determined. There are a variety of different ways to determine G. For example, it may be the case that G is chosen so that the total length of the FEC repair packet is approximately the same length as a typical or maximum length FEC source packet. As another example, G may be chosen differently for different FEC repair packets in order to ensure that the total amount of repair symbols sent in FEC repair packets for a particular source block is as close as possible to a provided target number of repair symbols per source block. In this exemplary description, for simplicity the number of repair symbols per FEC repair packet is the same value G for all FEC repair packets.

Also in Step 820 the number R of FEC repair packets to generate and transmit for the source block is determined. The determination of R, may be based on factors such as known characteristics of the network, available bandwidth, ongoing feedback to the FEC sender on network conditions from network elements, and direct ongoing feedback to the FEC sender from receivers of the streams.

Also in Step 820 the first ESI to be used for a repair symbol, the value of I, is initialized to K and the number of sent FEC repair packets s is initialized to zero. In this exemplary description, the ESI values for repair symbols start at K and are consecutive, and in some embodiments this is a preferred ESI indexing scheme for repair symbols. However, other ways of choosing the ESI values for repair symbols are also possible, including for example, choosing ESIs pseudo-randomly from the entire set of possible ESI values if the set of possible ESI values for the FEC code is large and the amount of computation required by the FEC encoder and FEC decoder does not strongly depend on the ESI values (as is the case with multi-stage fountain codes), or starting the ESI at 0 and continuing consecutively if the possible ESI values for repair symbols is disjoint from the possible ESI values for source symbols.

In Step 830 the FEC encoder is used to generate the G repair symbols that correspond to ESIs I through I+G−1 from the source block, where the FEC encoder can be any suitable FEC encoder. In Step 840 an FEC repair packet is formed that comprises the RFPID=(N,I,K), followed by the G repair symbols. Also in Step 840 the FEC repair packet is passed to IP/UDP to add the IP/UDP header and transmit the packet to the IP network. There may be other logic that determines the exact timing of the transmission of the FEC repair packet to the IP network that is not shown.

In Step 850 the value of s is incremented by one to reflect the generation and passing of an FEC repair packet and the value of I is incremented by G to the next ESI that will be used for the first repair symbol in the next FEC repair packet, if any. In Step 860 it is determined if s<R, and if this test is true then processing returns to Step 830 to generate additional FEC repair packets, but if this test is false then processing is finished on the source block as indicated by Step 870.

FEC Receiver

There are two cases to consider for the FEC receiver, the case when the FEC receiver does not have the FEC decoder corresponding to the FEC encoder used by the FEC sender and the case when the FEC receiver has the FEC decoder corresponding to the FEC encoder used by the FEC sender.

It is possible that a receiver that does not have the FEC decoder simply does not receive FEC repair packets, and receives either just original source packets or just FEC source packets. If the receiver receives just original source packets then no further explanation of the logic is needed, since from its perspective no FEC is used at all. If the receiver receives just FEC source packets, but no FEC repair packets, then the logic is similar but slightly simpler than the exemplary description in FIG. 9. This case is possible for example because the FEC repair packets are sent in a stream that the FEC receiver has not asked to receive or as another example because there is a network element that has filtered out the FEC repair packets so that the FEC receiver does not have to process them.

Figure 9:
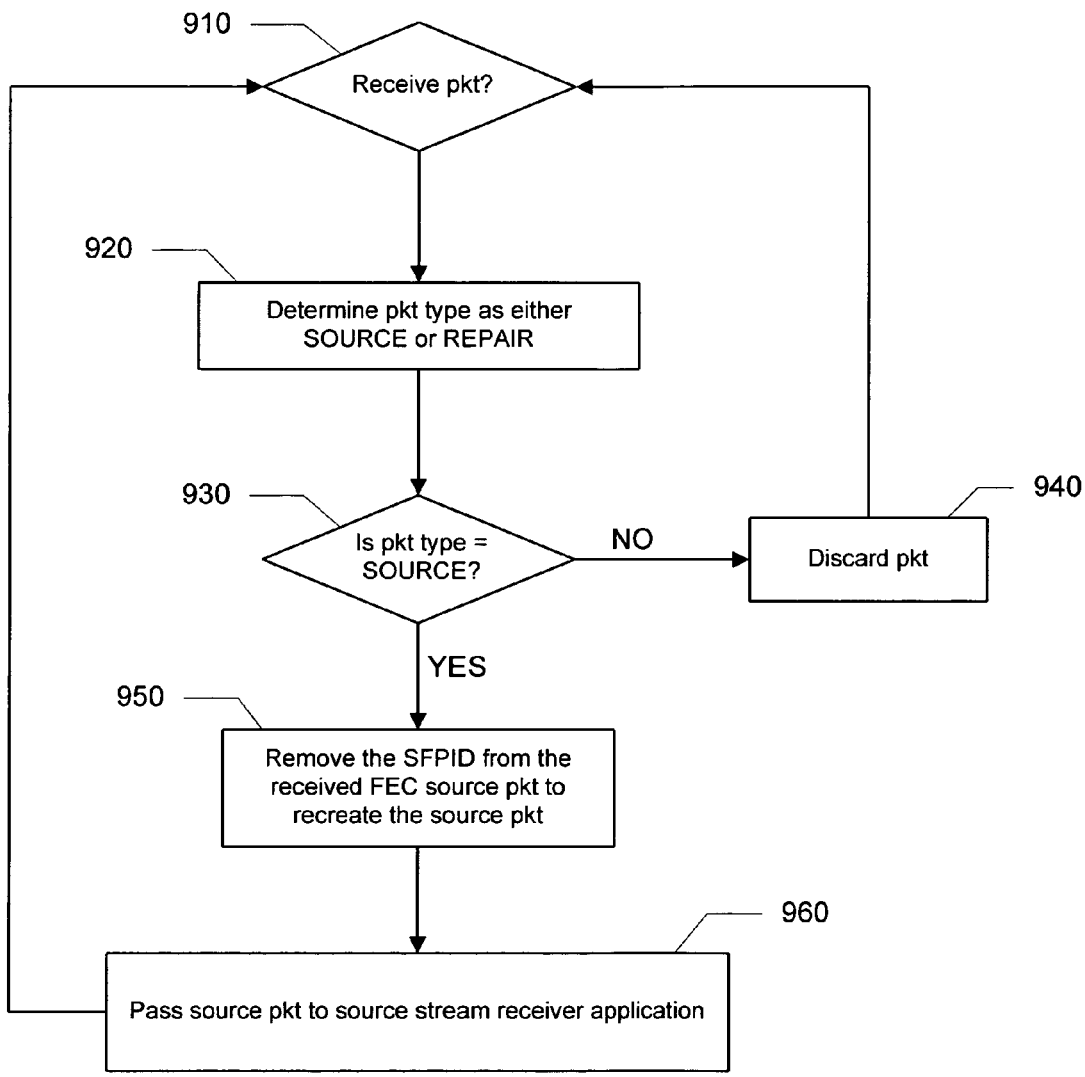
FIG. 9 is an illustrative embodiment of the logic of an FEC receiver that does not have the FEC decoder corresponding to the FEC encoder used by the FEC sender.

FIG. 9 is an exemplary description of the logic of an FEC receiver that does not have the FEC decoder corresponding to the FEC encoder used by the FEC sender and that receives both the original and repair streams. In Step 910 it is determined if another packet has been received, where it is assumed in this description that only packets pertaining to the original or repair stream of the session are received by this process, i.e., higher level processes have already filtered out any packets that are not part of the session. In Step 920 it is determined if the received packet is of type SOURCE (FEC source packet) or REPAIR (FEC repair packet), where this determination is made for example based on the address or port number on which the packet is received, or by other indications in the packet headers.

In Step 930 it is checked to see if the packet type is SOURCE, and if this is false then the packet is an FEC repair packet and processing continues to Step 940 where the packet is discarded and then processing proceeds to Step 910. If the test in Step 930 is true, then in Step 950 the SFPID is removed from the received FEC source packet to recreate the source packet and then in Step 960 the source packet is passed on to the source stream receiver application, after which processing proceeds to Step 910. Note that the FEC receiver can discard the SFPID in Step 950 without having the FEC decoder logic because the format of the SFPID is the same for all FEC codes.

Figure 10:
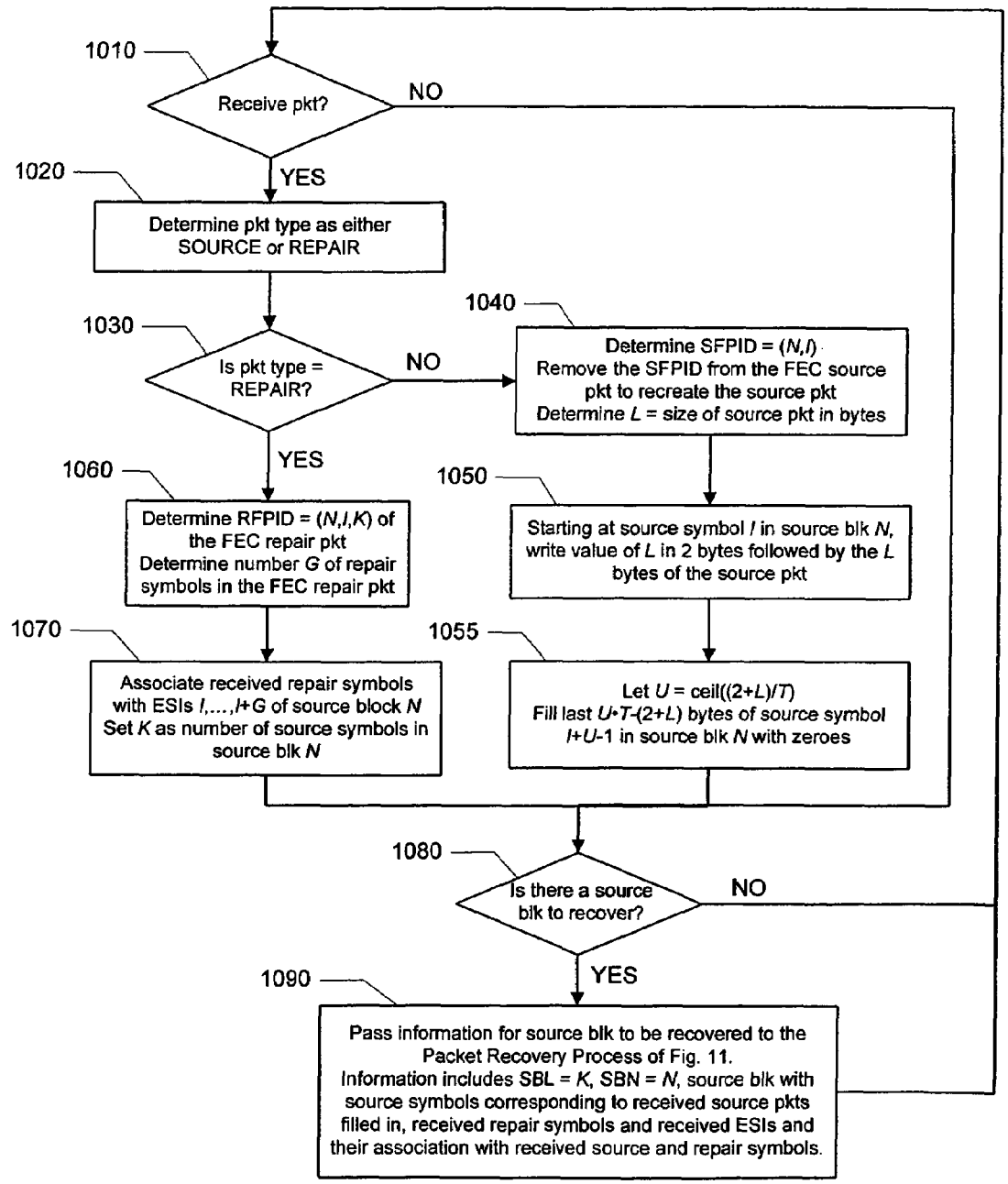
FIG. 10 is an illustrative embodiment of the logic of a Packet Receiver Process that could be part of an FEC receiver that does have the FEC decoder corresponding to the FEC encoder used by the FEC sender.
Figure 11:
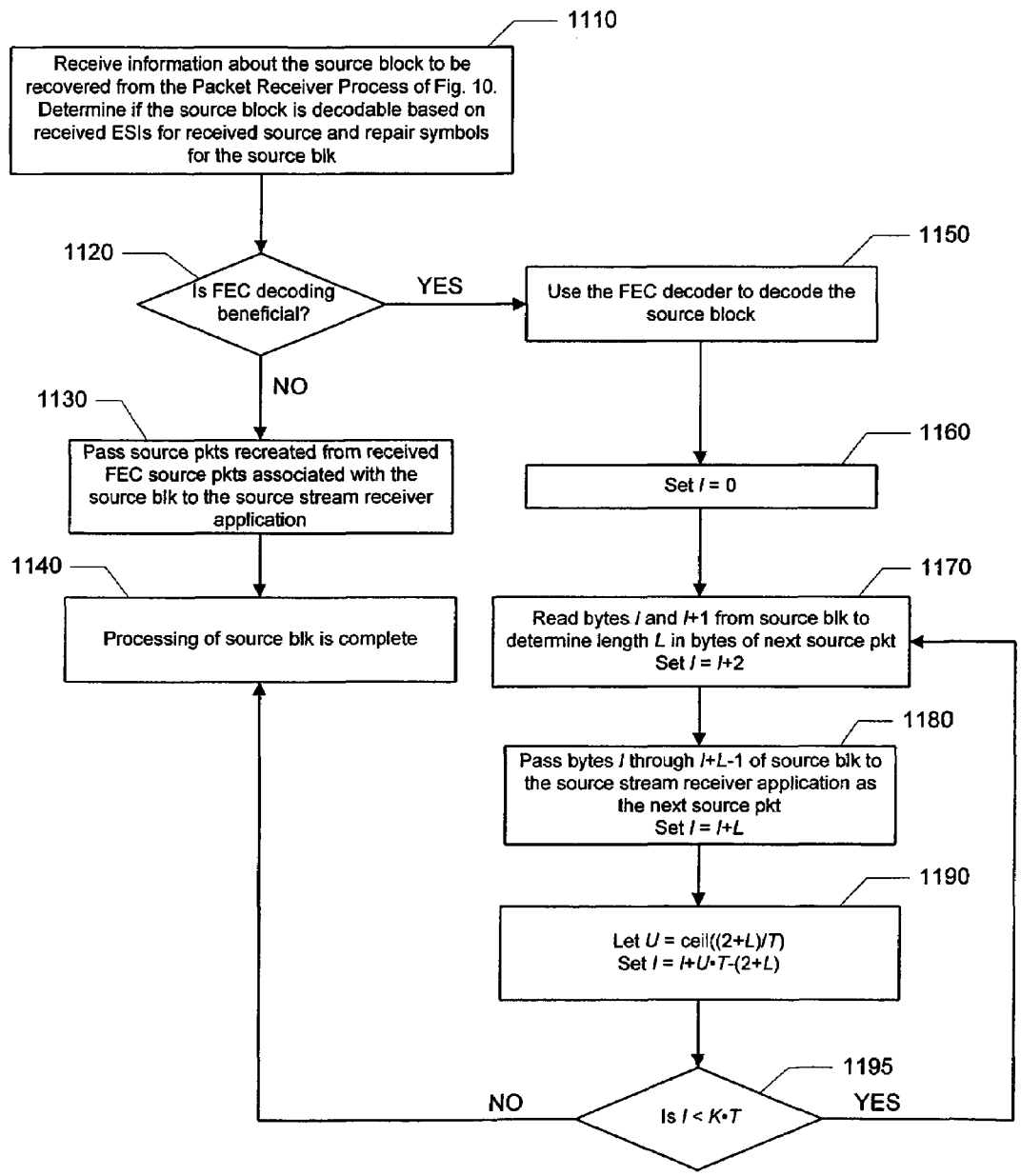
FIG. 11 is an illustrative embodiment of the logic of a Packet Recovery Process that could be part of an FEC receiver that does have the FEC decoder corresponding to the FEC encoder used by the FEC sender.

In the exemplary description of the logic of an FEC receiver when the FEC receiver has the FEC decoder corresponding to the FEC encoder used by the FEC sender, the FEC receiver is described as comprising two parts, a Packet Receiver Process that is shown in FIG. 10 and a Packet Recovery Process that is shown in FIG. 11.

An exemplary description of the logic of the Packet Receiver Process is shown in FIG. 10. In Step 1010, a test is made to see if a packet from the source or repair stream of the session has been received, and if this is true then processing continues to Step 1020 whereas if this is false then processing goes to Step 1080. In Step 1020 it is determined if the packet type is SOURCE (FEC source packet) or REPAIR (FEC repair packet). In Step 1030 a test is made to see if the packet type is REPAIR, and if this is true then processing continues to Step 1060 and if this is false then processing goes to Step 1040. In Step 1040 the SFPID=(N,I) for the received FEC source packet is determined, and the SFPID is removed from the FEC source packet to recreate the source packet, and the length L of the source packet in bytes is determined. The value of L can be determined for example from an indication of the length in bytes of the FEC source packet. In Step 1050, starting at the source symbol with ESI=I in the source block with SBN=N, the value of L is written into 2-bytes followed immediately by the L bytes of the source packet. In Step 1055 the value of U is computed, where U is the number of source symbols that are filled or partially filled in Step 1050, and then the last U·T−(2+L) bytes of the source symbol with ESI=I+U−1 is filled with zeroes, and then processing continues to Step 1080.

In Step 1060 of FIG. 10 the RFPID=(N,I,K) for the received FEC repair packet is determined, and the number G of repair symbols contained in the repair packet is determined. The value of G can be determined for example from an indication of the length in bytes of the FEC repair packet and the knowledge of the symbol size T. In Step 1070, the G repair symbols in the FEC repair packet are associated with the ESIs I, I+1, . . . , I+G−1 of the source block with SBN=N, and the source block length SBL is set to K for the source block, all based on the RFPID. Thus, a receiver can determine from the RFPID of an FEC repair packet, which source block the FEC repair packet's symbols protect (from the SBN) and which repair symbols are present (from the ESI). The ESI and the FEC encoder in use determine how the repair symbols are generated from the source symbols of the source block. Note that more generally the ESI values for the repair symbols contained in an FEC repair packet should be generated in Step 1070 based on the ESI value I contained in the RFPID using the same method as used by the FEC sender to generate ESI values when creating that FEC repair packet, where this method could depend on the FEC encoder used by the FEC sender. More generally, the ESI and the FEC encoder in use should provide a well-defined interpretation of how the repair symbols in a packet containing the ESI are generated from the source block. After Step 1070 is completed processing continues to Step 1080.

In Step 1080 of FIG. 10 a test is made to see if there is a source block to recover. If the test is true then processing goes to Step 1090, whereas if the test is false then processing jumps back to Step 1010. In Step 1090 the information for the source block is passed to the Packet Recovery Process of FIG. 11, where this information includes SBL=K, SBN=N, the source block with source symbols corresponding to the received source packets filled in, received repair symbols and received ESIs and their association with received source and repair symbols. After this information is passed along, processing jumps back to Step 1010.

An exemplary description of the logic of the Packet Recovery Process is shown in FIG. 11. In Step 1110 the information about the source block to be recovered is received from the Packet Receiver Process described of FIG. 10, and then it is determined if the source block is decodable based on received ESIs for the received source and repair symbols for the source block. In Step 1120 it is tested to see if the FEC decoding is beneficial, and if this is false then processing continues to Step 1130 whereas if this is true then processing goes to Step 1150. FEC decoding is beneficial if all or some of the source symbols that are missing from the source block and can be recovered by using the FEC decoder based on received source and repair symbols.

In Step 1130, all source packets recreated from received FEC source packets associated with the source block are passed to the source stream receiver application, and then as indicated in Step 1140 processing of the source block is complete. Note that this case includes the case when all of the FEC source packets for the source block are received, and thus the FEC decoder is not needed to recover any of the source packets for the source block.

In Step 1150 the FEC decoder is used to decode the source block based on information received in Step 1110. The number of source symbols that need to be recovered using repair symbols is the total number of source symbols in the source block covered by the missing source packets. Note that, depending on the properties of the FEC decoder, the source block may be partially decodable, i.e., the FEC decoder may be able to recover some source symbols corresponding to FEC source packets that were not received while for the same source block the FEC decoder may not be able to recover other source symbols corresponding to FEC source packets that were not received. However, to simplify the description of the logic in the subsequent steps, it is assumed that the entire source block is recovered by the FEC decoder.

In Steps 1160 a byte counter I is initialized to zero in preparation for the loop defined by Steps 1170 through 1195 for parsing out the source packets of the recovered source block. In Step 1170, the 2 bytes of the source block at indices I and I+1 are read from the source block to determine the length L in bytes of the next source packet in the source block, and then the value of I is reset to I+2. In Step 1180, the L bytes of the source block with indices I through I+L−1 are passed to the source stream receiver application and then I is reset to I+L in preparation for the next source packet.

In Step 1190, the value of U is determined, where U is the number of source symbols filled or partially filled in the source block by the source packet just passed to the source stream receiver application, and then I is reset to I+U·T−(2+L) to skip over the zero-padded bytes of the last such source symbol to the beginning of the data for the next source packet in the source block. In Step 1195, a test is made to determine if I<K·T, where K is the number of source symbols in the source block and T is the symbol length in bytes, and if this test is false then processing of the source block is complete as indicated by Step 1140, whereas if this test if true then processing loops back to Step 1170 to continue parsing out the remaining source packets from the source block.

Design Considerations and Benefits

Although the source symbols in the source block are preferably always identified by 0, . . . , K−1, this is not FEC code specific, as any systematic FEC code can use this convention without loss of generality. This reduces the risk of incompatibilities between different FEC codes, and allows the same SFPID format and interpretation for FEC source packets independent of which FEC code is used. This means that the processes of adding the SFPID to source packets to create FEC source packets at the FEC sender and removing the SFPID from received FEC source packets to create source packets at the FEC receiver are independent of the FEC code in use, unifying and simplifying the FEC sender and FEC receiver software. This also means that the length of the SFPID added to the source packets does not have to be carried in the initial session information received by an FEC receiver, because it is the same length for all FEC codes.

The SFPID and RFPID formats can be the same, but there are benefits to having these be different. The source block length is needed by any FEC decoder to decode the source block using repair symbol to recover missing source symbol. However, the source block length is not needed and may not be available when the FEC source packets are sent. The source block length is not needed in FEC source packets because FEC source packets alone are not used to recover other source packets. Since it is not needed it is a waste of packet space to include the source block length in the SFPID added to source packets. The source block length may not be available when the FEC source packets are sent because the source block may not yet be fully formed and its length may be unknown at that time. One could restrict source blocks to be all the same length, but this could lead to wasteful padding of source blocks to fill them out to full length. Furthermore, if all source blocks were the same length then it might make sense to include the source block length in the initial session information instead of in the SFPID or the RFPID. The FEC sender could also wait until the source block length is available when the source block is complete before sending any FEC source packet for that source block so that it can be included in the SFPID added to source packets, for example when the FEC repair packets for a source block are sent before the FEC source packets for that source block, but this adds additional latencies to the overall streaming solution that can be unacceptable for some streaming applications. For other applications, sending the FEC repair packets before the FEC source packets for a source block might be acceptable and desirable.

On the other hand, since the source block length is needed by the FEC decoder to decode the source block and since the FEC decoder is only used if FEC repair packets are received to recover missing source packets, the source block length is needed if any FEC repair packets are received, and thus the source block length should be included in the RFPID of FEC repair packets.

Prepending the source packet length to the source packet in the source block has some design advantages. Once the source block is decoded, the individual source packets that constitute the source block often need to be parsed and sent as individual entities to the source stream receiver application. The lengths of the received FEC source packets can be directly obtained from their reception, which directly determines the length of the recreated source packet, but the lengths of source packets that are decoded using repair symbols are also needed (and which source packets will be decoded and which will be received directly is unknown when the source block is formed). The pre-pended lengths of the source packets in the source block are used to determine where one source packet ends and where the next source packet begins in the source block (these can be different due to a source packet not ending on a symbol boundary) and this allows the FEC decoder to present individual source packets to source stream receiver application. Prepending the length allows a single forward sweep though the decoded source block to delineate and present all of the source packets to the source stream receiver application.

Using a fixed symbol length for all source blocks in a session is preferred, since all source blocks in the session will generally be approximately the same length (protecting generally over a similar time interval of the stream), and since a good choice of the symbol size depends only mildly on the source block size, there is little loss of generality by fixing a symbol size for the entire session. A typical source packet (and its length) doesn't always fit into an integral number of source symbols and the last source symbol of the source packet can be truncated and not sent as part of the FEC source packet, and thus truncated source symbols are possibly sent that are to be padded out with zeroes at the FEC receiver when they are placed into the source block.

The ESI carried in the SFPID added to each source packet to form the FEC source packet is the starting symbol position in the source block where the data for that source packet begins, i.e., where the symbols related to the packet fit in the source block. The symbol length is used to place a source packet recreated from a received FEC source packet in the source block. Thus, if the symbol size were allowed to vary for each source block, then it would preferably be known to the FEC receiver when the first FEC source packets for the source block are received so that the source packets can be properly positioned in the source block immediately, and thus in this case it is preferable that the source block length SBL be included in the SFPID of FEC source packets.

Another design advantage is the use of potentially multiple symbols per packet. This can be very beneficial because of the variable lengths of source packets. If only one symbol per packet were allowed, then the symbol length would have to be large enough to accommodate the longest source packet, and this can be very wasteful in transmission bandwidth. For example, suppose a 200-byte source packet is to be sent and the symbol length is 500 bytes because the longest source packet to be sent is for example 498 bytes. Then, the packet information occupies 202 bytes in the source block (2 bytes for the length and 200 bytes for the packet) and this is padded out by 298 bytes to 500 bytes (but the padding bytes are not sent when the FEC source packet is sent). Whereas 202 bytes of repair data is ideally sufficient to recover the 202 bytes of data in the source block for the source packet if the FEC source packet is lost, instead a 500 byte repair symbol will be used to recover the 202 bytes of data in the source block if the FEC source packet is lost, which means that 298 bytes of the 500-byte repair symbol is wasted when it is used to recover the source packet corresponding to the lost FEC source packet, and this leads to wasted transmission bandwidth since the repair symbol is carried in a transmitted FEC repair packet.

Allowing multiple symbols per source packet, i.e., allowing the symbol length to be much shorter than a source packet length, allows much finer granularity of partitioning the source packet into symbols. This greatly reduces the wastage when repair symbols are used to recover lost source packets. In the above example, if the symbol length is 32 bytes, then the 202 bytes of data the packet occupies in the source block is only padded out by 22 bytes to 224 bytes (a multiple of the symbol length). In this case, if this packet is lost then there are only 22 wasted bytes in recovering it from 7 repair symbols each of length 32 bytes.

For all FEC codes, the recovery of a source block is in units of source symbols, i.e., a source symbol that is partially received is no more useful than a source symbol that is not received at all for the FEC decoding process. Each source packet is padded out to a source symbol boundary so that each source packet touches at most one partially filled source symbol at the end of the source packet in the source block. Thus, if the source packet is lost then, there are only wasted bytes in received repair symbols to recover the one partially filled source symbol. If the source packet data instead were just packed sequentially into the source block, without respecting source symbol boundaries, then the data for each source packet would generally touch two partially filled source symbols, one at either end of the data for the packet in the source block. On average, this would double the wasted bytes in received repair symbols used to recover the two partially filled source symbols. To avoid this waste, source blocks can be padded out to the next source symbol boundary at the end of the data for each source packet in the source block, so that symbols do not span packet boundaries.

Using the above-described methods and apparatus, a number of beneficial design features are made available. The FEC packet architectures for streaming services can be used by a wide class of FEC codes and allow usage of FEC codes that support adjustable source block-sizes for efficiency. It is possible to apply FEC to different media streams of a streaming session in different configurations with the possibility to not use FEC at all for selected media streams (for example FEC is applied to audio but not to video or vice versa). It is possible for a terminal at any time to start decoding and rendering a media stream after the reception of the first media packets of the corresponding media stream. Variable length packets have an only limited impact onto the overall performance.

It is to be understood that the various functional blocks in the above described figures may be implemented by a combination of hardware and/or software, and that in specific implementations some or all of the functionality of some of the blocks may be combined. Similarly, it is also to be understood that the various methods described herein may be implemented by a combination of hardware and/or software.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. In a packet communications system wherein stream data is transported from at least one transmitter to at least one receiver in packets over a channel over which packet loss or corruption is possible, a method of encoding stream data with forward error correction ("FEC") information comprising:

receiving source packets at the at least one transmitter, source packets comprising source data to be transported, the source data being stream data in that a transmitter transmitting the source data does not require that all of the stream data be available prior to beginning transmission;

generating FEC source packets, wherein the FEC source packets include information representing data from the source packets, formatted to allow for identification of lost or corrupted source packets at the one or more receiver;

arranging source data from the source packets into a plurality of source symbols wherein a first source packet in the source packets is arranged into a first number of source symbols, wherein a second source packet in the source packets is arranged into a second number of source symbols, wherein the first number of source symbols is different than the second number of source symbols;

associating a plurality of source symbols with a source block;

generating a plurality of repair symbols from the source symbols of the source block according to a predetermined FEC encoding process;

grouping the plurality of repair symbols into one or more FEC repair packets associated with the source block; and encoding the FEC source packets and the FEC repair packets for transmission.

2. The method of claim 1, wherein the channel is a broadcast channel and the one or more receiver comprises a plurality of broadcast receivers.

3. The method of claim 1, wherein arranging source data into source symbols comprises arranging the source data in a memory and maintaining state or processor logic for identifying source symbol boundaries in the source data.

4. The method of claim 1, wherein data of each source packet is associated with one source block and each source symbol is associated with one source packet and wherein associating the plurality of source symbols with a source block comprises storing a source block identifier for each source packet identifying the source block of the source symbols in the so-identified source packets.

5. The method of claim 4, wherein formatting of FEC source packets comprises formatting an FEC source packet using a format for a source packet plus at least an indicator of a source block identifier, the source block identifier identifying the source block with which the source symbols in the FEC source packet are associated.

6. The method of claim 5, wherein formatting of FEC source packets further comprises formatting an FEC source packet to include an indication of a starting symbol representing an offset into the source block pointing to a start of the FEC source packet's data within the source block.

7. The method of claim 1, wherein source blocks are sized to provide suitable error recovery performance, packets are sized to provide suitable transmission performance and comply with packet network size constraints, and symbols are sized to allow for processing of data for repair symbol generation and data recovery in a limited memory space.

8. The method of claim 1, wherein source packets are variable length and wherein the one or more receivers are provided with indications of source packet length usable in a decoding process for decoding source symbols from a received source block.

9. The method of claim 8 wherein the number of source symbols arranged out of a source packet is done in a way that minimally covers the source data from the source packet.

10. The method of claim 1 wherein the first source packet is a different size than the second source packet.

11. The method of claim 1 wherein a size of a source symbol is selected to optimize an amount of padding inserted into the last source symbol arranged out of a source packet.

12. The method of claim 1, wherein the stream data comprises more than one logical data stream.

13. The method of claim 12, wherein source packets associated with a first logical data stream are larger than source packets associated with a second logical data stream.

14. The method of claim 13, wherein the number of source symbols arranged from source packets associated with the first logical data stream is more than number of source symbols arranged from the source packets associated with the second logical data stream.

15. The method of claim 14 wherein the first logical data stream carries video data, and wherein the second logical data stream carries audio data.

16. In a packet communications system wherein stream data is transported from at least one transmitter to at least one receiver in packets over a channel over which packet loss or corruption is possible, a method of transporting the stream data with forward error correction ("FEC") information comprising:

receiving source packets at the at least one transmitter, source packets comprising source data to be transported, the source data being stream data in that a transmitter transmitting the source data does not require that all of the stream data be available prior to beginning transmission;

generating FEC source packets, wherein the FEC source packets include information representing data from the source packets, formatted to allow for identification of lost or corrupted source packets at the one or more receiver;

arranging source data from the source packets into a plurality of source symbols wherein a first source packet in the source packets is arranged into a first number of source symbols, wherein a second source packet in the source packets is arranged into a second number of source symbols, wherein the first number of source symbols is different than the second number of source symbols;

associating a plurality of source symbols with a source block;

generating a plurality of repair symbols from the source block according to a predetermined FEC encoding process;

grouping the plurality of repair symbols into one or more FEC repair packets associated with the source block;

encoding the FEC source packets and the FEC repair packets for transmission;

transmitting the FEC source packets and the FEC repair packets over the channel;

receiving a received version of the FEC source packets and zero or more of the FEC repair packets;

determining if any of the FEC source packets are lost or corrupted;

if any of the FEC source packets are lost or corrupted, determining missing source symbols associated with the lost or corrupted FEC source packets;

recovering the missing source symbols using repair symbols from one or more of the received FEC repair packets; and outputting, at the one or more receiver, all or part of a reconstructed stream of data representing data received by the at least one transmitter.

17. The method of claim 16 wherein the first source packet is a different size than the second source packet.

18. In a packet receiver that receives packets over a communications system representing source stream data, the received packets including forward error correction ("FEC")

source packets and FEC repair packets, wherein the FEC source packets include information representing data from the source packets, formatted to allow for identification of lost or corrupted source packets at the packet receiver, wherein a first source packet in the source packets comprises a first number of source symbols, wherein a second source packet in the source packets comprises a second number of source symbols, wherein the first number of source symbols is different than the second number of source symbols and wherein a source block for FEC encoding spans a plurality of source packets, FEC encoding comprising repair symbols generated from source symbols of the source block, and wherein the FEC repair packets comprise the repair symbols, a method of decoding received data to derive the source stream data comprising:

receiving a plurality of FEC source packets;

determining the source symbols of the received FEC source packets;

mapping the determined source symbols to symbol locations within a source block;

determining if any source symbols are missing from the source block;

if missing source symbols are needed, determining received FEC repair packets corresponding to the source block;

determining FEC repair symbols from the received FEC repair packets;

using at least the received FEC repair symbols to determine the missing source symbol values; and arranging the recovered source block into source packets representing source stream data.

19. The method of claim 18 wherein the first source packet is a different size than the second source packet.

20. The method of claim 18, wherein arranging the recovered source block into source packets representing source stream comprises arranging the source stream data into packets corresponding to original source packet boundaries.

* * * * *

UNITED STATES PATENT AND TRADEMARK OFFICE
CERTIFICATE OF CORRECTION

PATENT NO. : 7,660,245 B1  
APPLICATION NO. : 11/229009  
DATED : February 9, 2010  
INVENTOR(S) : Michael Luby It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Twenty-eighth Day of December, 2010

David J. Kappos  
*Director of the United States Patent and Trademark Office*